United States Patent Office 3,361,808
Patented Jan. 2, 1968

3,361,808
PREPARATION OF α,ω-SUBSTITUTED-BIS-n-ALKYLTHIOPROPANE-1,3 COMPOUNDS
Derek L. Ransley, Berkeley, Calif., assignor to Chevron Research Company, a corporation of Delaware
No Drawing. Filed Nov. 15, 1963, Ser. No. 323,920
4 Claims. (Cl. 260—533)

The present invention is directed to a process for the production of α,ω-functionally-substituted 1,3-propanedithiol derivatives.

More particularly, it is directed to the production of α,ω - difunctionally - substituted bis-n-alkylthiopropane-1,3 compounds characterized by the general formula:

$$(Z-R-S)_2(-CH_2CH_2CH_2-)$$

in which Z is a functional group relatively inert to free radical chemical attack and R represents branched- and straight-chain alkylene radical groups having from 1 to 5 carbon atoms per group.

In the process of the present invention, an ω-substituted alkyl thiol is contacted under autogenous pressure conditions with allene, preferably in the presence of an organic inert liquid diluent under liquid phase free radical reaction conditions. Under these conditions, the subject α,ω-functionally substituted bis-alkylthiopropane-1,3 compounds are produced in high yields.

By inert liquid diluents is meant those relatively unreactive organic solvents such as alkanes, aromatic hydrocarbons, benzene, chlorobenzene, bromobenzene, cyclohexane, heptane, octane and the like which do not compete favorably under free radical reaction conditions with thiols and allene in a determinative product sense to produce or yield free radicals. That is, no solvent molecule becomes a component of the compounded products under reaction conditions.

By liquid phase free radical reaction conditions is meant the contacting of a liquid mixture of thiol and allene, preferably allene and thiol in the presence of an inert liquid diluent under catalytic free radical generating conditions, including thermal dissociation of known organic free radical precursor compounds, such as organic peroxidic and organic azo compounds, as well as free radical generation in the reaction medium by irradiation by radiant energy, including high energy, high frequency vibrational means, light, electron bombardment and the like.

In general, suitable reaction temperatures are in the range from below about 150° C. to just above the temperature of the melting point for the particular reaction mixture. Preferably, reaction temperatures below about 100° C. are employed.

Representative free radical precursor compounds are azobis-isobutyronitrile, benzoyl peroxide, di-tertiary butyl peroxide, cumene hydroperoxide, methyl ethyl ketone hydroperoxide, lauroyl diperoxide, t-butylperacetate, t-butylperbenzoate, di-t-butyldiperthalate and the like, that is, known organic compounds capable of thermal dissociation at temperatures below 150° C., thereby yielding free radical fragments capable of initiating free radical n-hexyl thiol addition to n-hexene-1. In general, from about 1–10 mol percent (based on thiol) of the free radical precursor compounds is required.

In a preferred embodiment of the present process, benzene and the desired ω-substituted thiol, for example, $HS(CH_2)_3OH$, are charged to an autoclave in which the relative volume relationship of benzene to thiol employed is about 0.5–100 volumes of benzene for each volume of the thiol. In addition, allene in an amount such that the mol ratio of thiol to allene is preferably about 2:1, which corresponds to stoichiometric requirements, and from about 1–4% (based on thiol) of a free radical reaction catalyst, for example, azobis-isobutyronitrile, are charged to the autoclave. Under autogenous pressure and at a temperature of about 50° C., reaction commences as shown by a drop in the autoclave pressure. When the autoclave pressure becomes relatively stabilized, an increase of temperature, for example, to 65° C. and higher, usually serves to drive the reaction farther towards completion. In general, reaction periods of from 0.5–10 hours are adequate but may vary depending upon the particular feed, its purity and the particular free radical initiator means employed. In any event, the reaction is best and most conveniently monitored by following the pressure change. In general, and because the products are stable compounds, recoveries by distillation or distillation under reduced pressure are most convenient.

Representative substituent groups corresponding to Z of the general formula include HO—, $HO_2C$—, $$CH_3-OSO_3-$$

$N\equiv C$—, $CH_3O$—, Cl—, Br—, F—, $CH_3-OCO_2$—, $C_2H_5OCO_2$—, (o, m, or p)·$HO_2CC_6H_4$—, (o, m, or p)—$CH_3-O-CO_2C_6H_4$— and the like.

These functional groups have in common the property that they are relatively inert to free radical attack in the presence of the sulfhydryl group (—SH) and allene functionalities. All known substituent groups are satisfactory which are essentially unaffected under the following free radical relative reactivity test conditions:

| | |
|---|---|
| Temperature, °C. | 50 |
| Allene, mols | 0.1 |
| n-Hexyl thiol | 0.2 |
| n-Hexyl-X | 0.2 |
| Azobis-isobutyronitrile, grams | 1–4 |
| Time, hours | 0.2 |
| Pressure | Autogenous | where X is the substituent group. All substituent groups which are satisfactory as substituent groups for the ω-substituted thiols of the present invention demonstrate a negative free radical relative reactivity test. That is, in the test reaction product, for all practical purposes, only n-hexyl-thiol has adducted to allene.

In the manner described above for the preferred embodiment, the reactions listed in Table I following were carried out with the results noted.

TABLE I.—CONDITIONS AND PRODUCT DISTRIBUTION FROM THE REACTION OF ALLENE WITH MERCAPTANS

| RSH | RSH, mols | Allene, mols | AIBN, Percent | Time, min. | Yield,[1] Percent | Product |
|---|---|---|---|---|---|---|
| $HOCH_2CH_2$— | 0.250 | 0.125 | 1.3 | 90 | 97.0 | $(HOCH_2CH_2S)_2(-CH_2CH_2CH_2-)$ |
| | 2.100 | 0.900 | 2.0 | 40 | 84.0 | |
| $HOOCCH_2$— | 0.214 | 0.100 | 2.9 | 255 | 97.7 | $(HO_2CCH_2S-)_2(-CH_2CH_2CH_2-)$ |
| $HOOCCH_2CH_2$— | 0.200 | 0.100 | 3.1 | 245 | 97.0 | $(HO_2CCH_2CH_2S-)_2(-CH_2CH_2CH_2-)$ |

[1] Yield based on thiol reacted.

The characterization of the above products involved the use of elemental analysis, nuclear magnetic resonance (NMR), infrared spectra determination (IR), and molecular weight determinations. The data are listed in Tables II and III. The adduct from thioglycolic acid was initially an oil but it finally crystallized. After its conversion to the dimethyl ester, distillation yielded the analytical samples for which the data are also listed.

TABLE II.—PRODUCT CHARACTERIZATIONS

| $RSCH_2CH_2CH_2SR$ | Calculated | | Found | | Calculated Mol. Wt. | Found Mol. Wt. | $N_{25}{}^D$ | M.P. or B.P., °C. |
|---|---|---|---|---|---|---|---|---|
| | C, Percent | H, Percent | C, Percent | H, Percent | | | | |
| $HO-CH_2CH_2-$ | 42.82 | 8.21 | 43.00 | 8.17 | 196 | ---- | 1.5485 | [2] 159-161 |
| $HOOCCH_2-$ | ---- | ---- | ---- | ---- | 224 | [1] 225 | ---- | [2] 141-143 |
| $CH_3OOCCH_2-$ | 42.83 | 6.39 | 42.68 | 6.16 | 252 | ---- | 1.5094 | 106.5-107 |
| $HOOCCH_2CH_2-$ | 42.85 | 6.39 | 42.74 | 6.49 | 252 | [1] 254 | ---- | |

[1] From neutralization equivalent.
[2] 0.5 mm.

TABLE III.—NMR AND IR OF SULFIDES MADE FROM ALLENE

| $R-SCH_2CH_2CH_2-SR$ | NMR Expressed as p.p.m.[b] | | | | Pertinent IR, cm.$^{-1}$ |
|---|---|---|---|---|---|
| $HOCH_2CH_2-$ | 4.91(T) | 3.91(Q) | 2.86(T) | 2.04(P)[c] | 3,500 |
| $HOOCCH_2-CH_2-$ [a] | 10.62(S) | 2.6-2.9(M)[d] | 1.90(P)[c] | ---- | 1,710 |
| $HOOCCH_2-$ | 10.89(S) | 3.54(S) | 2.90(T) | 2.04(P)[c] | 1,710 |
| $CH_3OOCCH_2-$ | 3.70(S) | 3.29(S) | 2.73(T) | 1.86(P)[c] | 1,755, 1,280 |

[a] NMR run in $CDCl_3$.
[b] Downfield from tetramethylsilane.
[c] Ill-defined pentuplet.
[d] Methylene adjacent to $C=O$ and those next to sulfur overlap.

(S)=Singlet, (D)=Doublet, (T)=Triplet, (Q)=Quartet, (P)=Pentuplet, (M)=Multiplet.

From the foregoing it is seen that excellent yields of α,ω-difunctional bis-n-alkylthiopropane-1,3 products are obtained in the present process. Particularly is this the case when the ratio of thiol to allene is at least 1.8 to 1. Excess thiol over 2.0 to 1 does not interfere with the reaction. The optimum and preferred ratio is about 2.0 to 1. The range 1.8 to 2.2 to 1 of thiol to allene, respectively, is desirably employed.

In direct contrast to the single product obtained by use of the ω-substituted thiol adducts of the present invention, such adducts as methyl thiol, ethyl thiol, phenyl thiol and p-Cl phenyl thiol were found to yield complex product mixtures containing from 2–5 different products, each being present in substantial amounts.

The bifunctional products of the present invention are useful per se as antioxidants by reason of their sulfur atom content. They are appreciably soluble in general in both polar and nonpolar solutions. By reason of their bifunctionality, they are particularly useful as additives and monomers for the production of resins and polymeric products.

Representative ω-substituted thiols useful in the present process are: $HO(CH_2)_2SH$, $HO_2CCH_2SH$, $CH_3OSO_3(CH_2)_4SH$, $NC(CH_2)_5SH$, $CH_3O(CH_2)_3SH$, $Br(CH_2)_4SH$, $Cl(CH_2)_3SH$, $p-CH_3O_2CC_6H_4(CH_2)_3SH$, $m-HO_2CC_6H_4(CH_2)_2SH$, $HO(CH_2)_5SH$, $HO_2CCH_2CHCH_3CH_2SH$ and the like. Lower alkyl carboxylate esters are preferred, that is, methyl, ethyl and propyl esters.

Representative products resulting from the reaction of the above thiols in the present process with allene are:

$[HO(CH_2)_2S-]_2(-CH_2CH_2-)$ $(HO_2CCH_2S-)_2(-CH_2CH_2CH_2-)$ $[CH_3OSO_3(CH_2)_4S]_2(-CH_2CH_2CH_2)$ $[N \equiv C-(CH_2)_5S]_2(-CH_2CH_2-CH_2-)$ $[Cl(CH_2)_3S]_2(-CH_2CH_2CH_2-)$ $[CH_3O(CH_2)_3S]_2(-CH_2CH_2CH_2-)$ $[p-CH_3O_2CC_6H_4(CH_2)_3S]_2(-CH_2CH_2CH_2)$ and the like.

The foregoing descriptive embodiments of the present invention are illustrative only. It is not the intent that the invention shall be construed as limited to the details of the description, except insofar as such limitations have been included in the terms of the following claims.

What is claimed is:

1. Process for the production of α,ω-difunctionally-substituted bis-alkylthiopropane-1,3 compounds characterized by the general formula:

$$(Z-R-S)_2(-CH_2CH_2CH_2-)$$

wherein R is an alkylene radical having from 1 to 5 carbon atoms per group, and Z is a functional substituent group relatively inert to free radical chemical attack which comprises reacting in the liquid phase a thiol characterized by the general formula:

$$Z-R-SH$$

and allene, said reaction being initiated by free radicals generated by thermal dissociation of free radical precursor compounds selected from the group consisting of organic peroxidic and organic azo compounds; at a temperature below about 100° C., at a pressure sufficient to maintain said liquid phase, and in the presence of from about 0.5–100 volumes of an organic inert liquid diluent per volume of said thiol, wherein the mol ratio of said thiol to allene is in the range 1.8–2.2 to 1, respectively, and recovering the resulting reaction product mixture containing the corresponding α,ω-difunctionally-substituted bis-alkylthiopropane-1,3 compound in high yield.

2. Process for the production of α,ω-hydroxy-bis-n-alkylthiopropane-1,3 compounds which comprises reacting allene and an ω-hydroxy-n-alkylthiol in the liquid phase in the presence of an inert organic liquid diluent, said reaction being initiated by free radicals generated by thermal dissociation of organic free radical precursor compounds, at a temperature below about 100° C. and a pressure sufficient to maintain said liquid phase, wherein said thiol contains from 1 to 5 carbon atoms per molecule, wherein the relative volume ratio of said thiol and said liquid diluent is in the range 1 to 0.5 to 100, respectively, and wherein the mole ratio of said thiol to allene is in the range 1.8 to 2.2 to 1, respectively, and recovering the resulting reaction product mixture containing the corresponding α,ω-hydroxy-bis-n-alkyl-thiopropane-1,3.

3. Process for the production of α,ω-carboxy-bis-n-alkylthiopropane-1,3 compounds which comprises reacting allene and an ω-carboxy-n-alkylthiol in the liquid phase in the presence of an inert organic liquid diluent, said reaction being initiated by free radicals generated by a source selected from the group consisting of thermal dissociation of organic peroxidic compounds, or organic azo compounds; radiant energy irradiation, high energy high frequency vibration and electron bombardment at a temperature below about 100° C. and at a pressure sufficient to maintain said liquid phase and wherein said thiol contains from 1 to 5 carbon atoms per molecule and recovering the resulting reaction product mixture containing the corresponding α,ω-carboxy-bis-n-alkylthiopropane-1,3.

4. Process of claim 3 wherein said free radical generating condition is thermal dissociation of organic free radical precurson compounds, wherein the relative volume ratio of said thiol and said liquid diluent is in the range 1 to 0.5 to 100, respectively, and wherein the mol ratio of thiol to allene is in the range 1.8 to 2.2 to 1, respectively.

References Cited

UNITED STATES PATENTS 2,892,852  6/1959  Koening et al. ____ 260—481 XR

OTHER REFERENCES

Walling et al.: J. Am Chem. Soc., 70 (1948), pp. 2559–2561.

Van Der Ploeg et al.: "Free-Radical Reactions of Allene: The Interaction of Allene and Thiyl Radicals." Recueil Des Travaux Chimiques 81, 775–85, (September-October 1962).

Walling: "Free Radicals in Solution," (1957), p. 258.

LORRAINE A. WEINBERGER, *Primary Examiner.*

S. B. WILLIAMS, *Assistant Examiner.*